(12) United States Patent
Guha

(10) Patent No.: US 11,422,859 B2
(45) Date of Patent: Aug. 23, 2022

(54) METHODS AND SYSTEMS FOR CLOUD APPLICATION OPTIMIZATION

(71) Applicant: Aloke Guha, Louisville, CO (US)

(72) Inventor: Aloke Guha, Louisville, CO (US)

( * ) Notice: Subject to any disclaimer, the term of this patent is extended or adjusted under 35 U.S.C. 154(b) by 170 days.

(21) Appl. No.: 16/540,031

(22) Filed: Aug. 13, 2019

(65) Prior Publication Data
US 2020/0089533 A1    Mar. 19, 2020

Related U.S. Application Data

(63) Continuation-in-part of application No. 16/352,793, filed on Mar. 13, 2019, now abandoned.

(60) Provisional application No. 62/642,003, filed on Mar. 13, 2018.

(51) Int. Cl.
*G06F 9/50* (2006.01)
*H04L 67/10* (2022.01)
*G06F 11/30* (2006.01)
*G06F 9/54* (2006.01)

(52) U.S. Cl.
CPC .......... *G06F 9/5005* (2013.01); *G06F 9/5072* (2013.01); *G06F 9/542* (2013.01); *G06F 11/3006* (2013.01); *H04L 67/10* (2013.01)

(58) Field of Classification Search
CPC .. G06F 9/5005; G06F 9/5072; G06F 11/3006; G06F 9/542; G06F 11/301; G06F 11/3419; G06F 11/3447; G06F 9/5083; G06F 2209/508; G06F 2209/501; H04L 67/10
See application file for complete search history.

(56) References Cited

U.S. PATENT DOCUMENTS

2019/0166007 A1\* 5/2019 Sundaram ................ G06F 9/50
2021/0019194 A1\* 1/2021 Bahl ..................... G06F 9/5072

\* cited by examiner

*Primary Examiner* — Sisley N Kim

(57) ABSTRACT

A computerized method for optimizing cloud application performance, including the step of monitoring of a cloud application. The method includes the step of building a full-stack view of the cloud application. The method includes the step of providing an application model. The method includes the step of mapping one or more cloud application performance needs to a set of cloud-resources based on the application model. The method includes the step of detecting a performance problem with the cloud application. The method includes the step of dynamically adjusting a specified layer of the cloud application to meet an application performance SLO. The method includes the step of, as cloud resources are consumed, determining a real-time aggregate cost for a specified application operation.

16 Claims, 14 Drawing Sheets

METHODS AND SYSTEMS FOR CLOUD APPLICATION OPTIMIZATION

CLAIM OF PRIORITY AND INCORPORATION BY REFERENCE

This application claims priority from U.S. application Ser. No. 16/352,793, filed on 13 Mar. 2019. U.S. application Ser. No. 16/352,793 claims priority from U.S. Provisional Application No. 62/642,003, filed 13 Mar. 2018. These applications are hereby incorporated by reference in their entirety for all purposes.

FIELD OF THE INVENTION

The invention is in the field of cloud computing and more specifically to a method, system and apparatus for cloud application optimization.

DESCRIPTION OF THE RELATED ART

The use of public cloud services for information technology (IT) infrastructure and software has been growing on a yearly basis. However, moving applications from local infrastructure a public cloud environment can create some big challenges. The local infrastructure can be a traditional well-known and controlled by enterprise. While, the public-cloud infrastructure can have an unknown and non-traditional infrastructure and services. Additionally, modeling, building and deploying applications, is non-trivial given that applications need to be architected in distributed fashion to enable scale and agility (unlike the traditional monolithic applications). Once the application is deployed, managing the application with respect to SLOs such as performance or availability or security in a cloud-computing platform can be a challenge for production operations teams. This can be caused by a number of factors that are driving cloud application complexity. Traditional approaches to manage applications that were effective on-premise are not effective for cloud applications due to the limited visibility and control over virtualized nature of cloud resources and services. Accordingly, there is a need to develop an end-to-end cloud application management platform designed to optimally manage enterprise applications on any cloud environment.

SUMMARY

A computerized method for optimizing cloud application performance, including the step of monitoring of a cloud application. The method includes the step of building a full-stack view of the cloud application. The method includes the step of providing an application model. The method includes the step of mapping one or more cloud application performance needs to a set of cloud-resources based on the application model. The method includes the step of detecting a performance problem with the cloud application. The method includes the step of dynamically adjusting a specified layer of the cloud application to meet an application performance SLO. The method includes the step of, as cloud resources are consumed, determining a real-time aggregate cost for a specified application operation.

Figure 9:
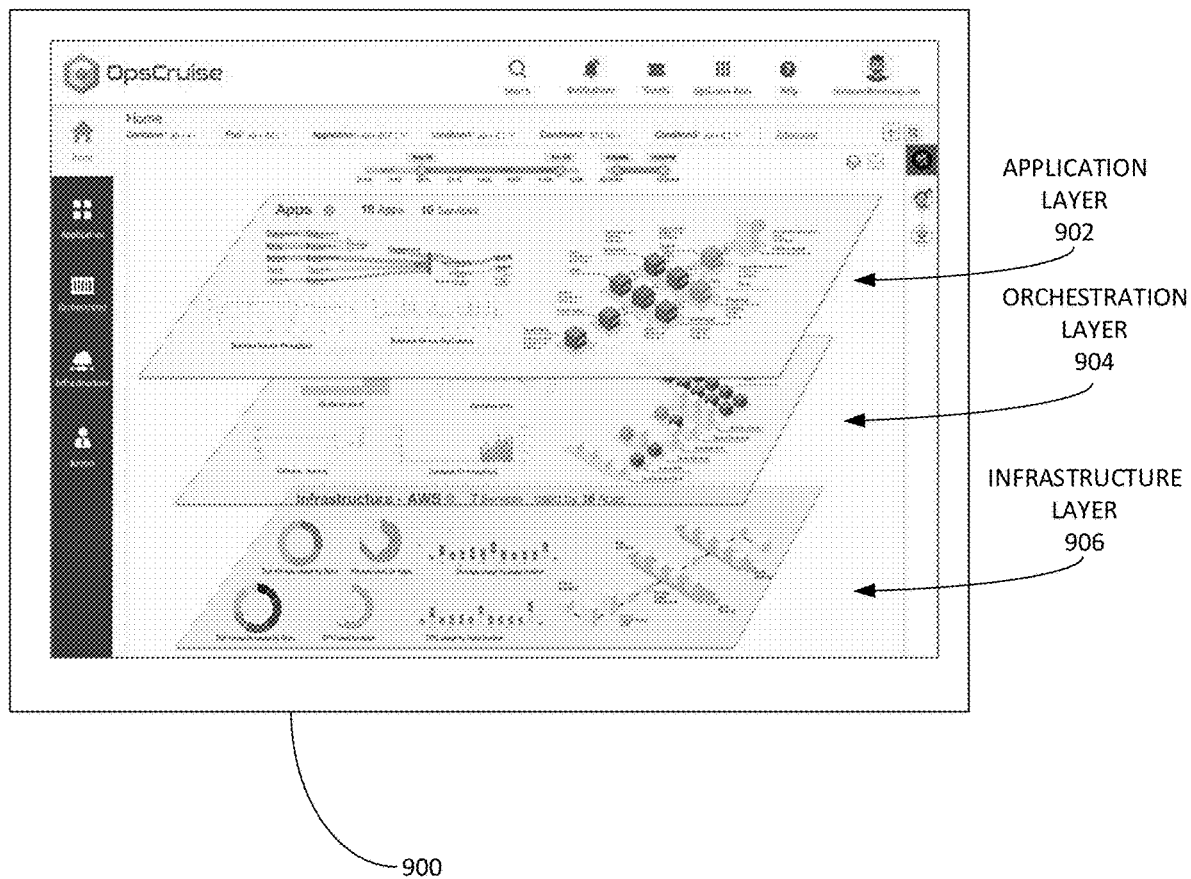

An example full-stack view of the cloud application as shown in FIG. 9, according to some embodiments.

Figure 10:
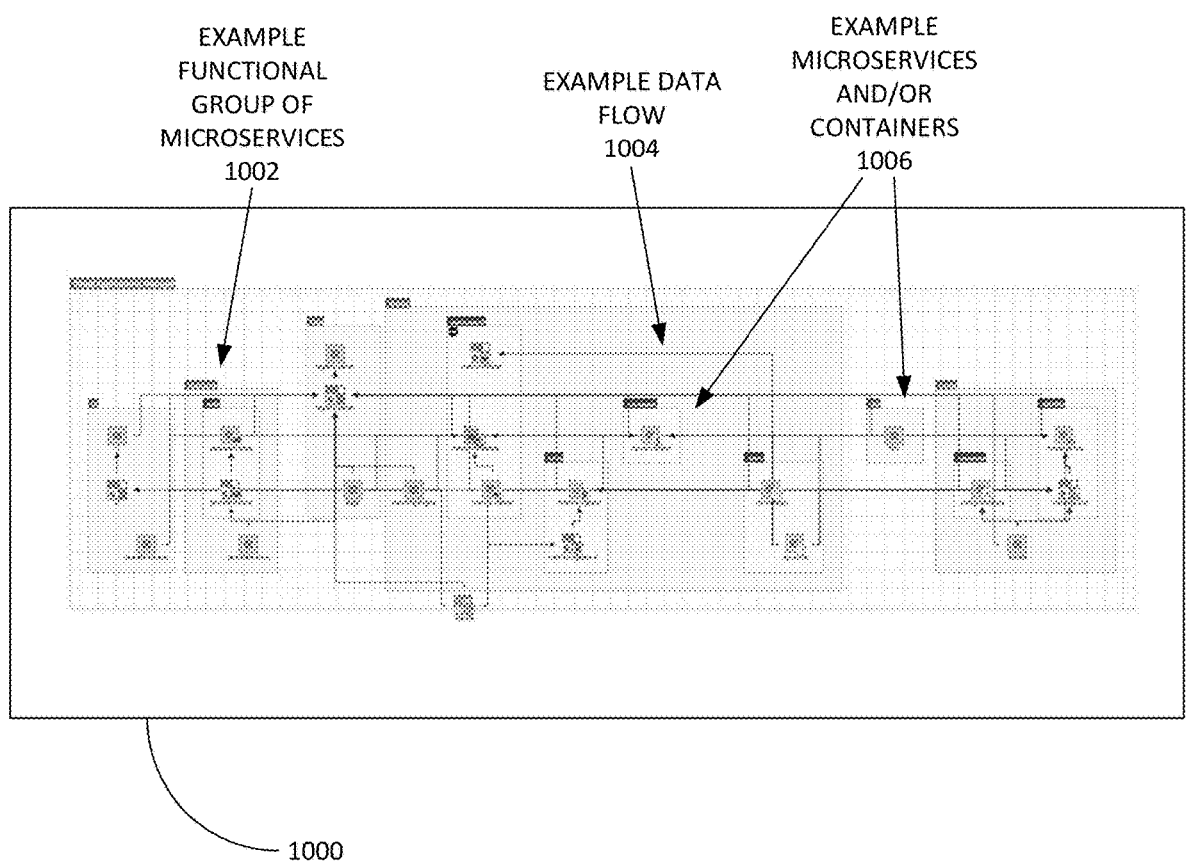

FIG. 10 illustrates an example container level view of a cloud application, according to some embodiments.

Figure 11:
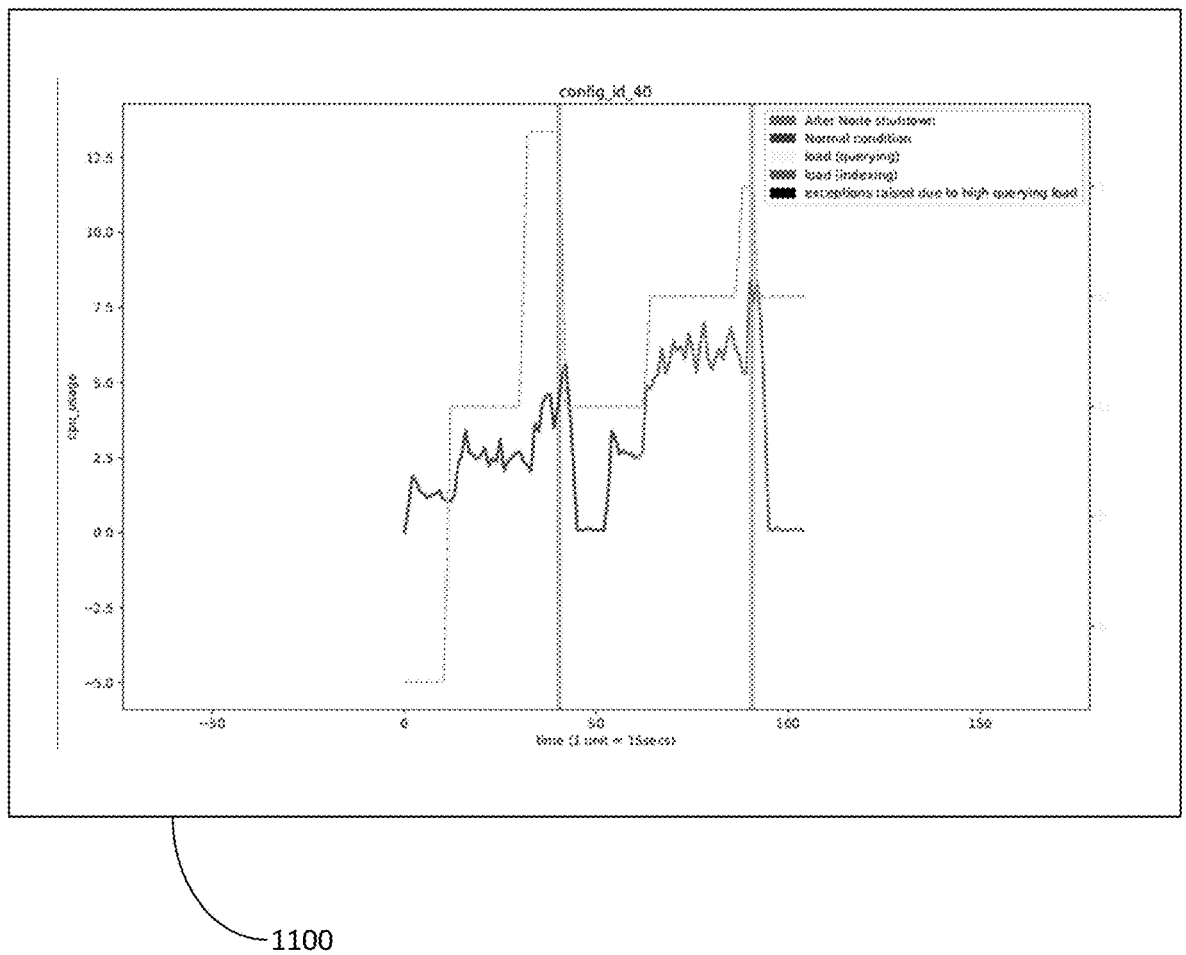

FIG. 11 illustrates an example view of CPU usage by time for a container, according some embodiments.

Figure 12:
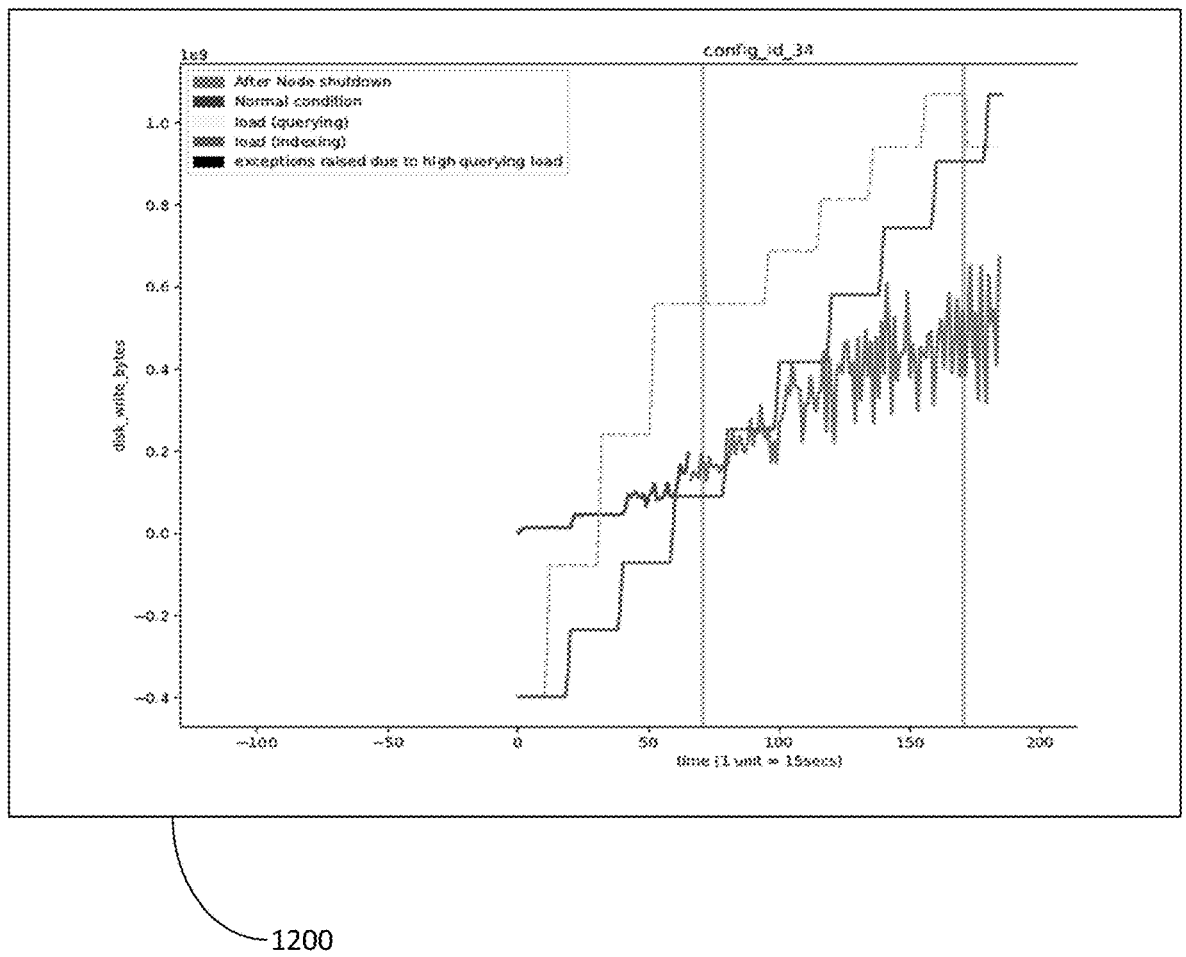

FIG. 12 illustrates an example view of disk usage (e.g. writes) by time for a container, according to some embodiments.

Figure 13:
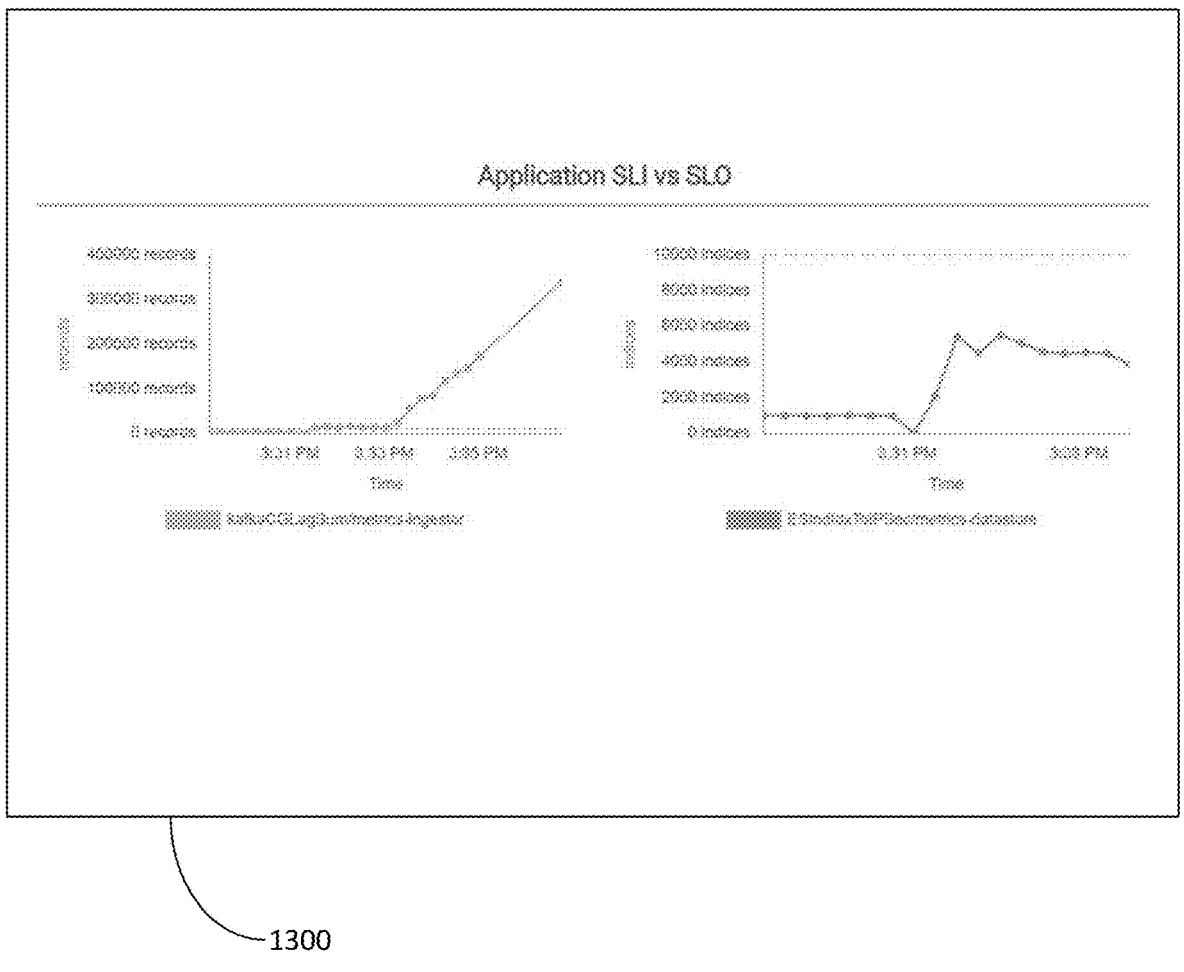

It is noted that, at the same time, SLOs are monitored against SLIs as shown in FIG. 13, according to some embodiments.

Figure 14:
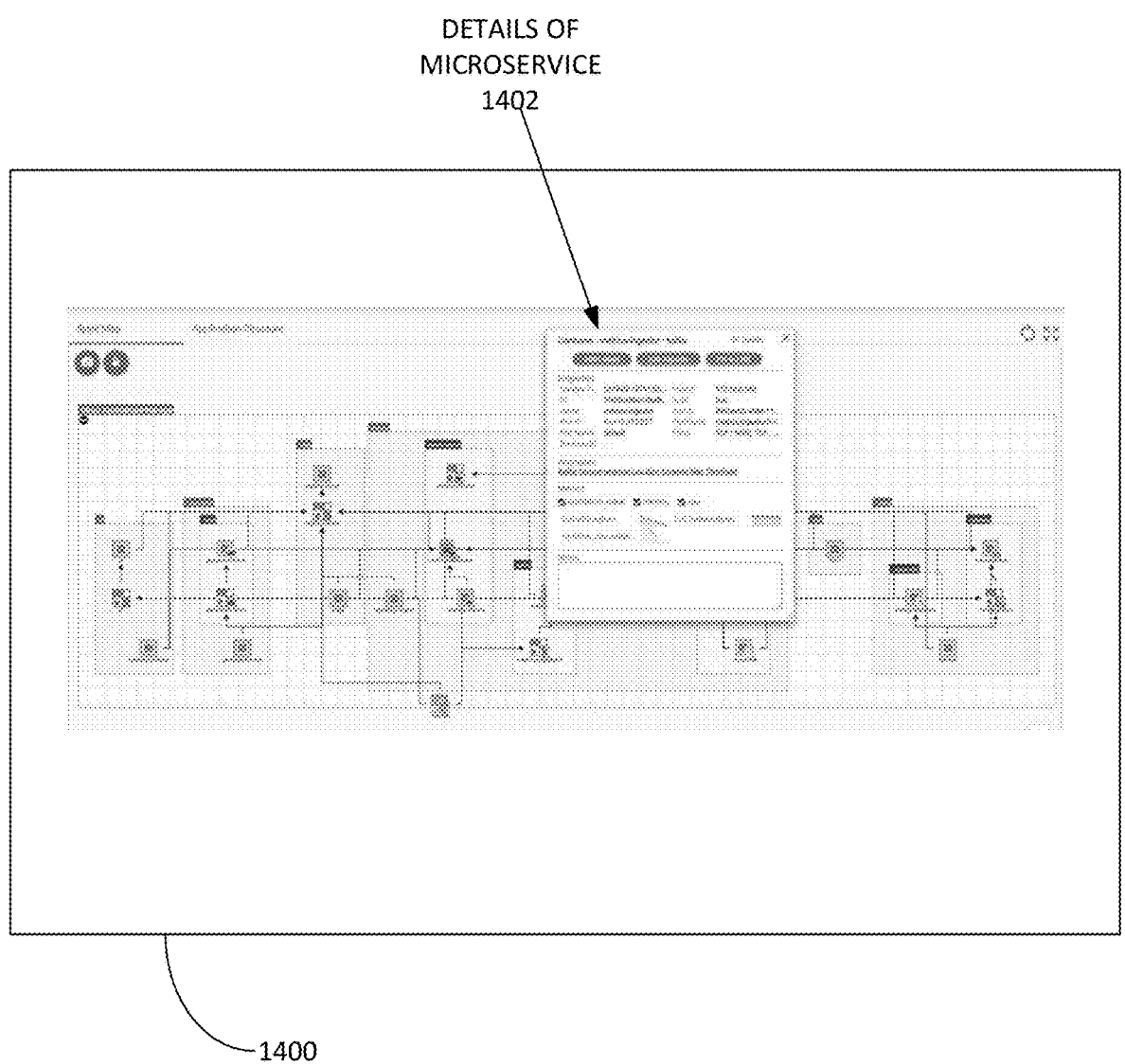

FIG. 14 illustrates an example with the performance SLO of Kafka, according to some embodiments.

The Figures described above are a representative set and are not an exhaustive with respect to embodying the invention.

DESCRIPTION

Disclosed are a system, method, and article of cloud application optimization operations. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Amazon Web Services is a collection of remote computing services. Amazon Elastic Container Service (ECS) is a highly scalable, high-performance container orchestration service that supports Docker containers and allows users to run and scale containerized applications on AWS. Amazon Relational Database Service, Amazon's cloud-based relational database service. Amazon DynamoDB is a NoSQL database service.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Container is an isolated user space in which computer programs run directly on the host operating system's kernel but have access to a restricted subset of its resources.

DevOps is a software development methodology that combines software development (Dev) with information technology operations (Ops). DevOps can shorten the systems development life cycle while also delivering features, fixes, and updates frequently in close alignment with business objectives.

Docker is a computer program that performs operating-system-level virtualization.

Key Performance Indicator (KPI) is a type of performance measurement. KPIs evaluate the success of an organization or of a particular activity (e.g. projects, programs, products and other initiatives) in which it engages.

Kubernetes is an open-source container orchestration system for automating application deployment, scaling, and management.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Monitoring can refer to collecting, processing, aggregating, and displaying real-time quantitative data about a system, such as, inter alia: query counts and types, error counts and types, processing times, and server lifetimes.

Optimization of a cloud application can refer to reducing cost of ownership of running the applications at the lowest cost while meeting business objective needs.

Runbook can be a compilation of routine procedures and operations that the system administrator or operator carries out.

Spatio-temporal reasoning is an area of artificial intelligence which involves representing and reasoning with spatial-temporal knowledge models.

Supervised learning is the machine learning task of learning a function that maps an input to an output based on example input-output pairs. It infers a function from labeled training data consisting of a set of training examples. In supervised learning, each example is a pair consisting of an input object (e.g. a vector) and a desired output value (e.g. a supervisory signal). A supervised learning algorithm analyzes the training data and produces an inferred function, which can be used for mapping new examples.

Service level agreement (SLA) can be an or implicit contract with a set of users that includes consequences of meeting (or missing) the SLOs they contain.

Service level indicator (SLI) can be a carefully defined quantitative measure of some aspect of the level of service that is provided. Example SLIs can include, inter alia: latency, error rate, system throughput, etc. Various measurements can be aggregated.

Service level objective (SLO) is a service level objective: a target value or range of values for a service level that is measured by an SLI. An example structure for SLOs is: SLI≤target, or lower bound≤SLI≤upper bound.

Example Cloud Application Optimization Model

A cloud application optimization for meeting specific operational goals is provided. The cloud application optimization can be for performance, availability, security, and/or even data governance for a given bound on cost. As an example, a specific optimization option would be extracting the best performance for the cloud application for the lowest cost, where the best performance is defined as meeting one or more service level objective(s) or SLOs such as latency of the application for performance, or downtime in hours per year for availability.

Figure 1:
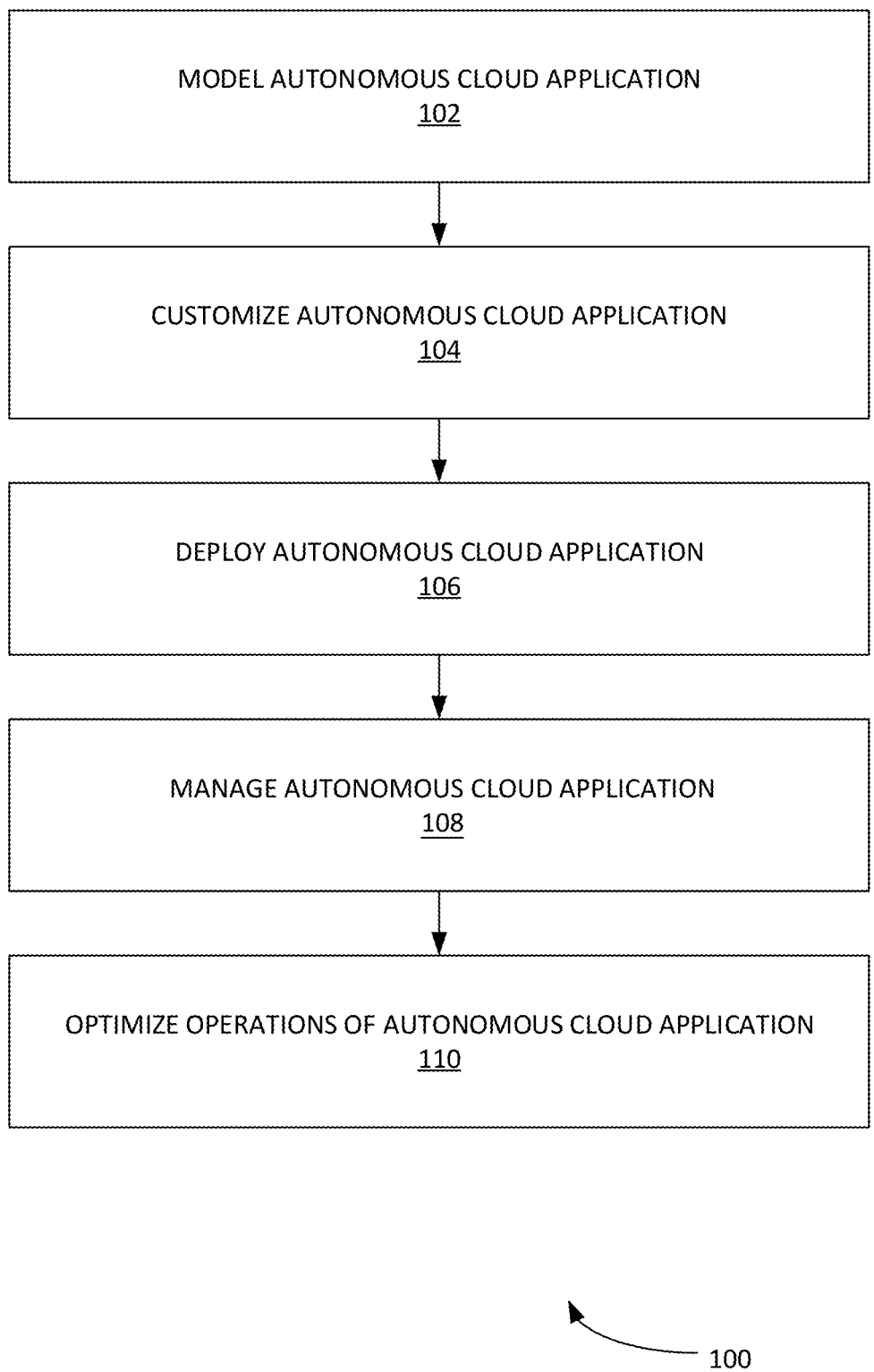
FIG. 1 illustrates an example cloud application management model, according to some embodiments.

FIG. 1 illustrates an example process 100 for implementing cloud application operations, according to some embodiments. It is noted that in some examples, cloud application can be an autonomous cloud application. It noted that as used herein, 'cloud' includes an on-premise data center (e.g. a private cloud) and/or public cloud. In step 102, process 100 can a cloud application constructed from components such as microservices such as those implemented by containers or even SaaS or serverless. Process 100 can implement a platform approach and can deploy and manage applications at scale. Accordingly, application owners and developers can model the behavior of their application at any scale without implementing code changes. Models of the cloud application can integrate with existing tools and frameworks. These models capture the behavior in terms of the resources and services the application needs under different workload demands. Models of cloud application can be used to deploy and manage the application on a preferred cloud infrastructure (e.g., as dictated by service level, data governance constraints and cost). The platform can enable an operations team to create clustered compute and storage resources on-premise or on a cloud-computing platform. It is noted that while various examples provided herein can pertain to using a public cloud-computing platform, the same steps are applicable for using on-premise resources within the limits of scalability that are possible for the on-premise resources. The first step is provisioning a specified cloud-platform infrastructure to run applications. In an example platform implementation, a cloud compute cluster (e.g., ECS instances in AWS, etc.) can be set up as a Kubernetes clusters with any applicable persistent storage volumes required to deploy the application. After the size of the number of instances on the specified cloud-platform infrastructure are specified, the platform graphical user interface (GUI) can display the compute instances under the named cloud instance.

In step 104, process 100 can customize cloud application. Process 100 can use the platform's application authoring GUI tool as well as other deployment tools such as CI/CD tools, such as Chef or Ansible, to enable the application owner and/or developer to select cluster-capable containerized components from a catalog. The application owner and/or developer can then build the applications, connect the components via their end-points and/or right-size the component cluster where applicable. For proprietary components, application owner and/or developer can containerize each relevant component and add it to a specified catalog. In this way, it can be reused to build other custom applications. Additionally, if the organization has an existing container image repository, such as a Docker registry, the catalog can import the registry and create an organization-specific custom registry for all applications and their constituent components. If the application when deployed to the public cloud is to avail of cloud vendor-specific microservices (e.g., AWS RDS, DynamoDB, etc.) these can also be added to the component catalog as well. In this way, the platform's application catalog and repository can evolve to be the master repository which contains the services that are needed to deploy into the target cloud environment.

Process 100 can customize the application and integrate it into a specified DevOps environment. For example, once the application has been modeled, the application owner and/or developer can add customizations specific to the application needs and the existing DevOps environment.

Two examples of customization for the applications are now discussed. A first example can include setting up auto-scaling on a per-component basis and setting auto-scaling limits for each component. A second example can include adding application-specific metrics or KPIs to be monitored in the operational dashboards, such as sending database query response times that may be a key metric for a data application. If the organization is already using third-party monitoring tools and services (e.g. Prometheus®, or New Relic® or Datadog®, etc.), those metrics can be integrated into the platform's data collection system so that the operations team has a holistic view of the application and information technology (IT) environment in a single dashboard. For monitoring application-specific metrics (e.g. end-to-end response time, database query response time, etc.), the platform can provide monitoring server endpoints to push those application-specific metrics. In this way, operations team can monitor the application performance and health.

In step 106, process 100 can deploy cloud application. Once the application has been modeled, the components sized, and the application-specific KPIs to be monitored have been added, the application can be deployed to the desired cloud site. In one example, this can be deployed directly from the model window. In some embodiments, a one-click deploy can be implemented. The one-click deploy can be independent of where infrastructure is located (e.g. whether on a public or a private cloud or an on-premise resources, etc.).

In step 108, process 100 can provide detailed visibility for insights and manage performance of the cloud application.

Figure 2:
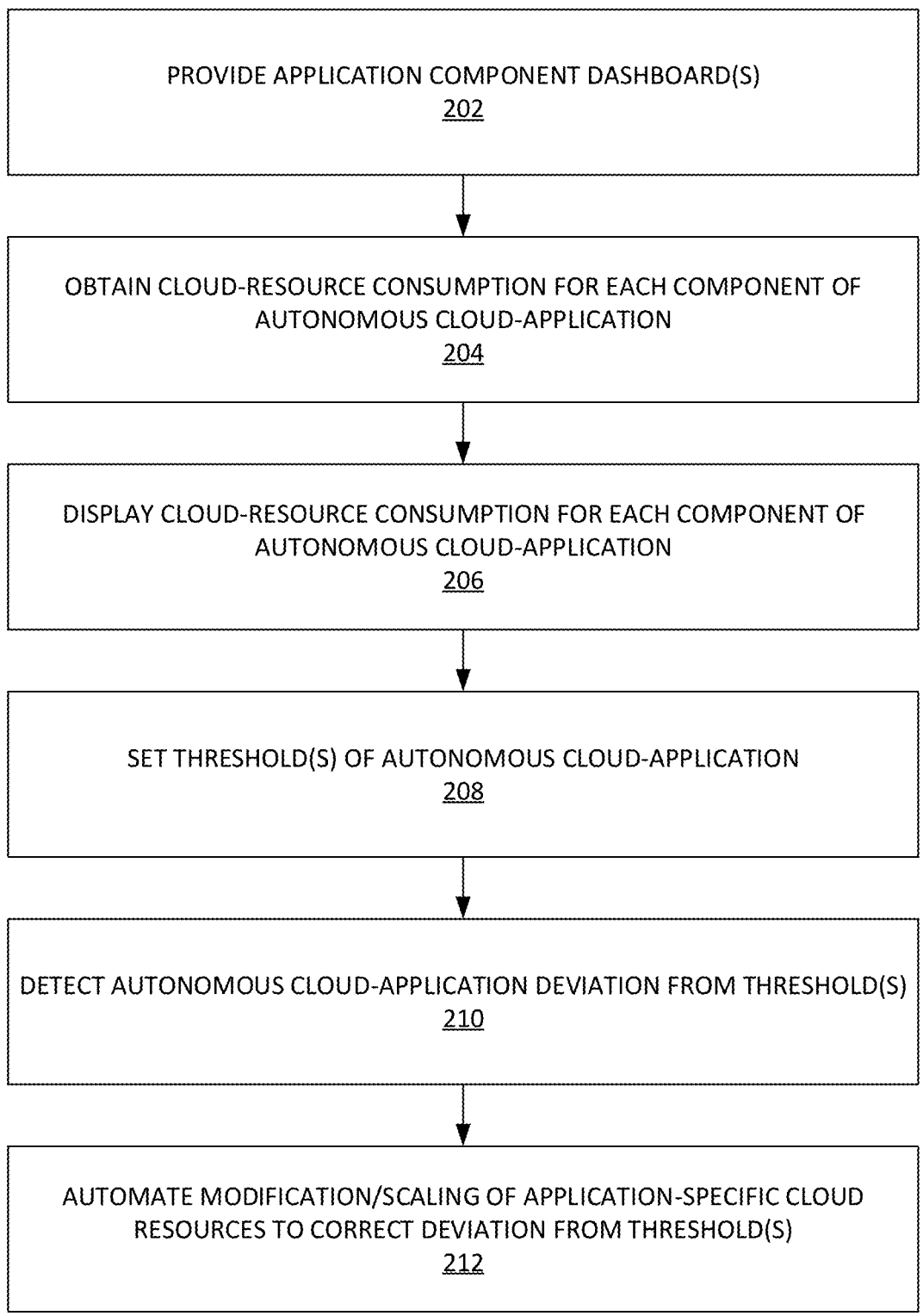
FIG. 2 an example process for providing visibility for insights and manage performance of the cloud application, according to some embodiments.

FIG. 2 an example process for providing visibility for insights and manage performance of the cloud application, according to some embodiments.

In step 202, process 200 can provide cloud application component dashboards. In step 204, process 200 can obtain cloud-resource consumption for each component of cloud application. In step 206, process 200 can display cloud-resource consumption for each component of cloud application. Process 200 can set dynamic threshold(s) of cloud application, based on known thresholds or those derived from the modeling step in 102. In step 208, process 200 can detect cloud application deviation from the current threshold(s). In step 210, process 200 can automate modification/scaling of application-specific cloud resources to correct deviation from threshold(s).

An example of process 200 is now discussed. Once the application has been deployed, the platform's real-time application monitoring is initiated. Process 200 can provide cloud application component dashboards. Process 200 can obtain cloud-resource consumption for each component of cloud application. For example, the dashboard can have an application-monitoring tab. This can be used to access a dashboard display of cloud resource consumption for each component. For clustered components, such as Cassandra®, Elasticsearch®, Spark®, etc. or load-balanced compute clusters, process 200 can enable a user to monitor each node of the cluster and its resource consumption.

It is noted that monitoring of low-level components for the application components allows an operations team to determine if the application is under-provisioned. However, from an application perspective, process 200 can be used to track application-specific metrics. In one example, process 200 can be utilized to search a cluster. Metrics (e.g., client response times, file indexing rate(s), etc.) can be measured. If a cloud application is not performing above a specified threshold of performance (e.g. client response times are above acceptable levels, etc.) process 200 can be used to identify thresholds at which the cluster is to be scaled-out and/or moved to a different scaled-up cluster. Accordingly, auto-scaling up can be automated to be driven by the application metrics (and not by CPU or memory or IO utilization). In this way, an operations team can be provided the direct control necessary to manage application-specific cloud resources without the guesswork of correlating low-level metrics using a generic monitoring framework. With this direct feedback from application monitoring, operations team can tune the application infrastructure requirements and track update the information for a given cloud in the source configuration management system, such as GitHub® and the like. This approach can become a part of the continuous integration and deployment (CI/CD) framework and increase the organization agility to ensure the application is running at the desired service levels. Process 200 can implement monitoring necessary for application operations optimization. Process 200 can build detailed insights by modeling behavior.

Returning to process 100, in step 110, operations of the cloud application can be optimized. Step 110 can include optimizing for both pro-active capacity planning, we well as continuous resource allocation, and optimizing with respect to the cost of resources.

Figure 3:
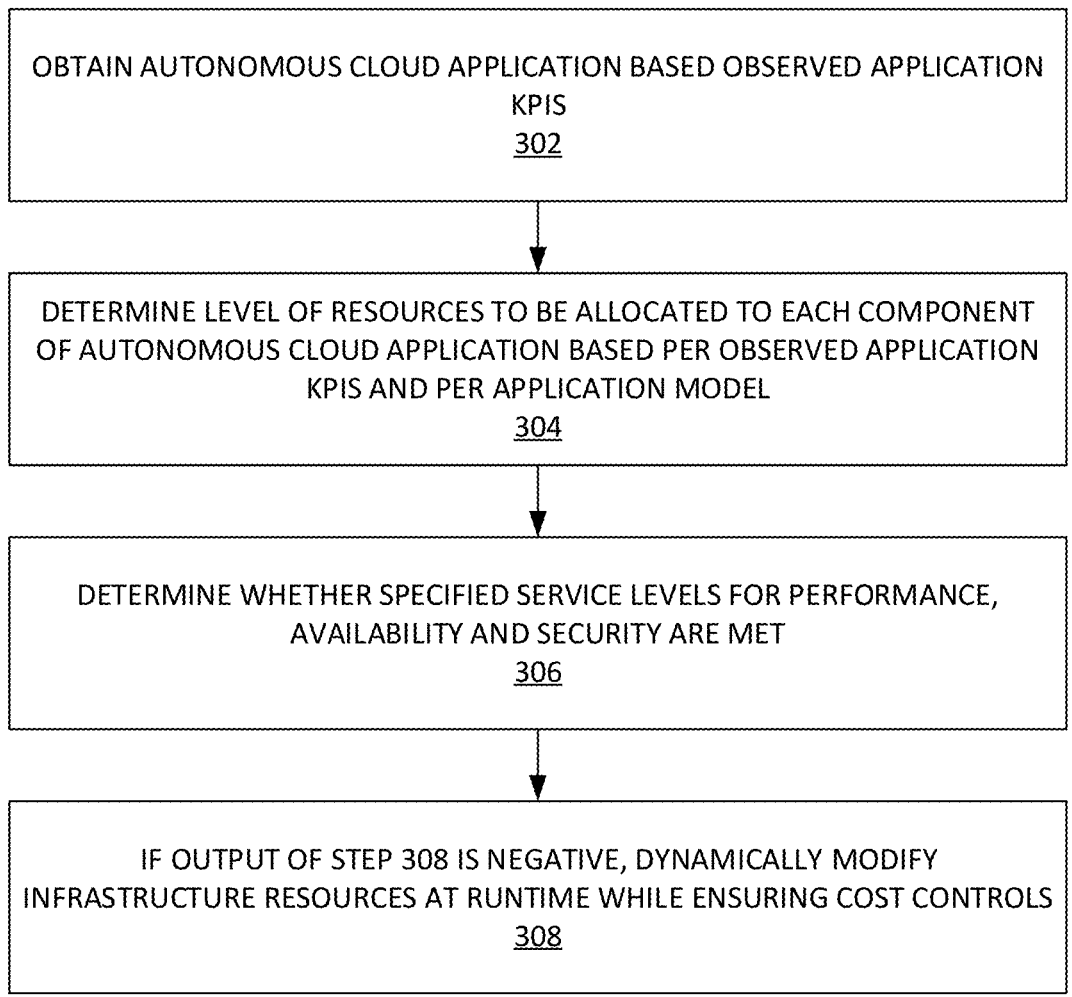
FIG. 3 illustrates an example process for optimizing the performance operations of a cloud application, according to some embodiments.

FIG. 3 illustrates an example process 300 for optimizing the operations of a cloud application, according to some embodiments. Process 300 can optimize for pro-active capacity planning and optimizing with respect to cost of resources. In step 302, process 300 can obtain cloud application based observed application KPIs. In step 304, process 300 can determine level of resources to be allocated to each component of cloud application based per observed application KPIs and per application model (e.g. as predicted by the model from 102, etc.). In step 306, process 300 can determine whether specified service levels for performance, availability and security are met. In step 308, if output of step 308 is negative, process 300 can dynamically modify infrastructure resources at runtime while ensuring cost controls.

An example of process 300 is now discussed. Process 300 can optimize the application operations by determining a level of resources to allocate to each component of said application. This can be based the per observed application KPIs or metrics. For example, the operations team can optimize the cloud-computing resource allocation per service levels on a per application basis. In this way, lower-priority applications do not consume more resources as the resources are directed to the higher priority applications. In this way, auto-scaling can be provided on an application-component basis, or in other cases when auto-scaling is not sufficient, determine if configuration changes that affect disk storage need to be made. With a built-in scale-back on a per application basis, process 300 can control cloud-computing costs and avoid underutilized or zombie instances. Process 300 can detect incidents anomalies. Process 300 can analyze an incident cause. Process 300 can correct via optimization actions.

Example Systems

Figure 4:
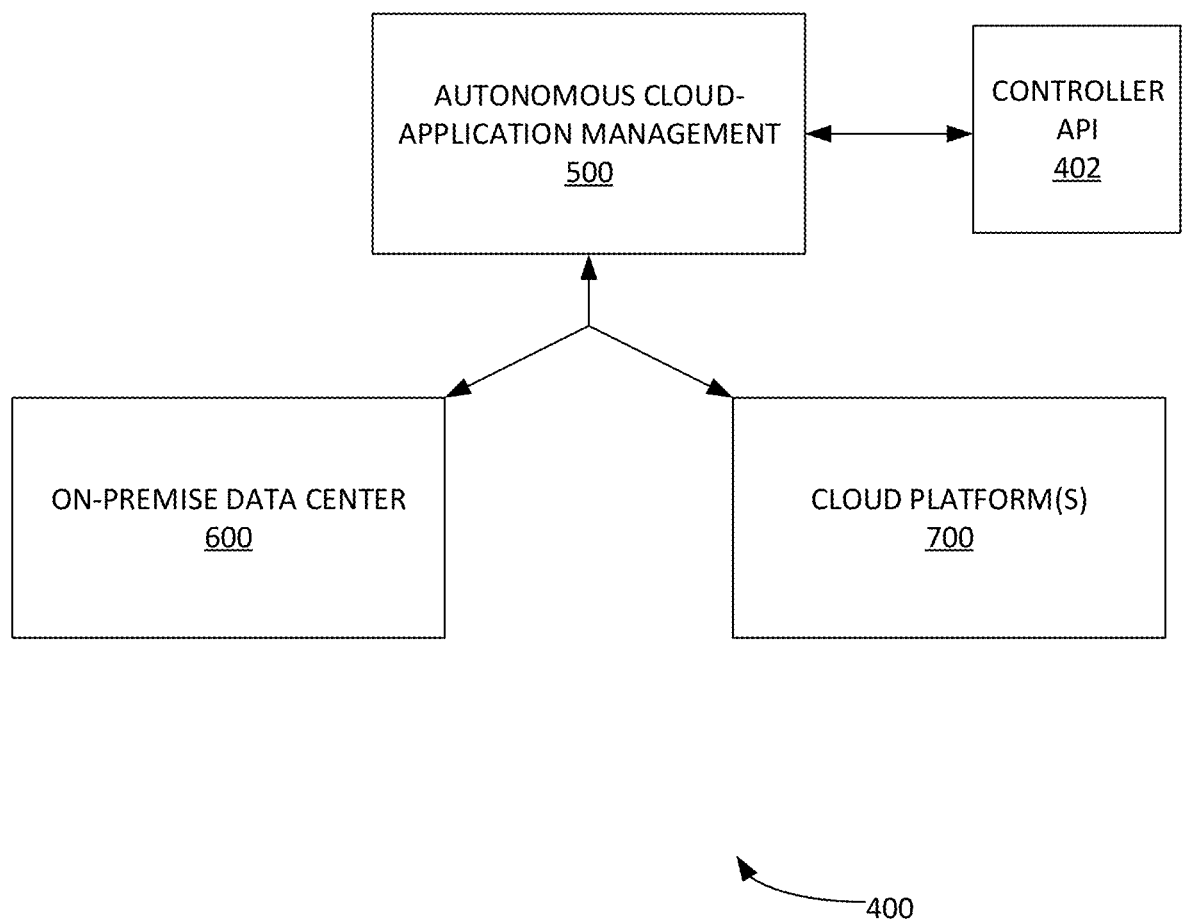
FIG. 4 illustrates an example hybrid-cloud-deployment cloud application management platform that spans multiple cloud sites, according to some embodiments.

FIG. 4 illustrates an example hybrid-cloud-deployment cloud application management platform that spans multiple cloud sites, according to some embodiments. System 400 includes cloud application management system 500, controller API 402, on-premise data center 600, cloud platform(s) 700. The deployment and operations of the autonomous cloud application can use the same process as shown in FIG. 1 and FIG. 2.

Figure 5:
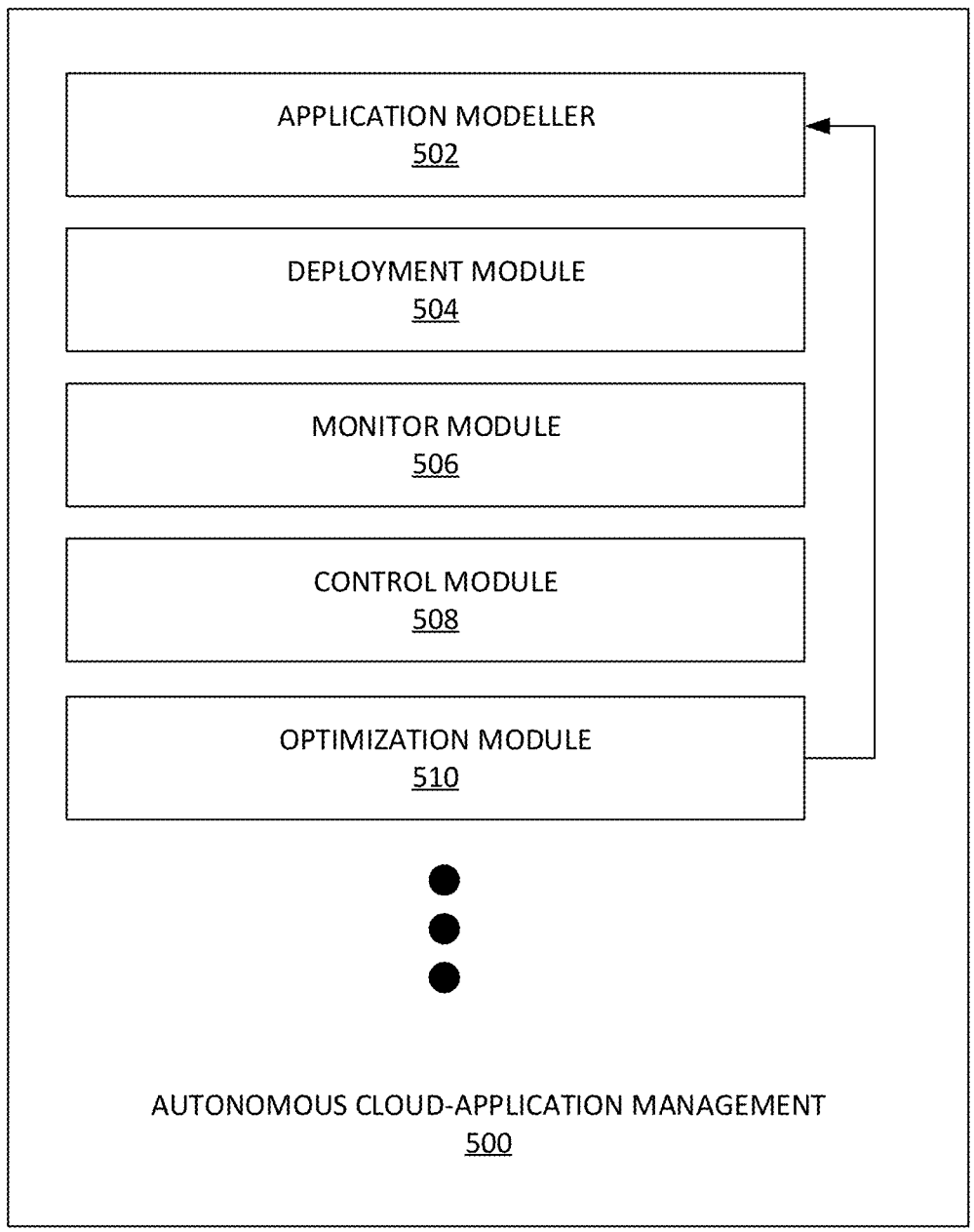
FIG. 5 illustrates a cloud application management system and its modules, according to some embodiments.

FIG. 5 illustrates a cloud application management system 500, according to some embodiments. Cloud application management system 500 provides an end-to-end cloud application management platform designed to optimally manage enterprise applications on any cloud, whether public, private or hybrid per performance service levels. cloud application management system 500 provides end-to-end cloud application management (e.g. on performance and health of cloud applications, etc.). Cloud application management system 500 can enable enterprises meet their application performance per service levels while optimizing cloud infrastructure resources. Cloud application management system 500 can be extended to actionable insights and prescriptive steps to remedy problems, and subsequently implement automated control by the production Ops team.

As shown in FIG. 5, the cloud application management system 500 can be embodied as an out-of-band controller. Cloud application management system 500 can run in a cloud-computing platform. Cloud application management system 500 can include one or more dedicated computing, local memory and data storage systems. Cloud application management system 500 can support application modeling, deployment, monitoring, control for managing performance, and optimization capabilities provided herein. The user (e.g. a developer, operator, etc.) can communicate with the API controller 402 via a user interface to model the application, set the configuration and service level objectives, as well as, obtain the cost optimization goals. API controller 402 can collect metric and configuration information from the private or public cloud environment. API controller 402 can send control and optimization inputs to the various services via their APIs on the cloud-computing platform. An example, optimization can be the determination of whether the application runs in an on-premise system and/or on a cloud-computing platform.

Cloud application management system 500 includes application modeler 502. Application modeler 502 can model cloud applications for application-aware deployment. Application modeler 502 can model application KPIs, auto-scaling limits, etc. Deployment module 504 can then deploys the application. Deployment module 504 can be used to select a deployment site.

Monitor module 506 can monitor and manage deployed cloud-based applications. Monitor module 506 can monitor low-level components for the cloud-based application's components. In this way, it can be determined if the cloud-based applications is under-provisioned. Monitor module 506 can track various specified application-specific metrics. These can depend on the type of cloud-based application being tracked and monitored. In one example, for a search cluster as in the case of Elasticsearch, metrics such as, inter alia, the client response times and the file indexing rate can be tracked. Monitor module 506 can enable direct feedback to re-optimize the cloud application operations in the event there is a change, for example in an application component such as the code in the container is updated. The re-optimization steps can direct the control module 508 to retune the application infrastructure requirements. Optimization module 510 can implement optimization algorithms such as process 300.

Figure 6:
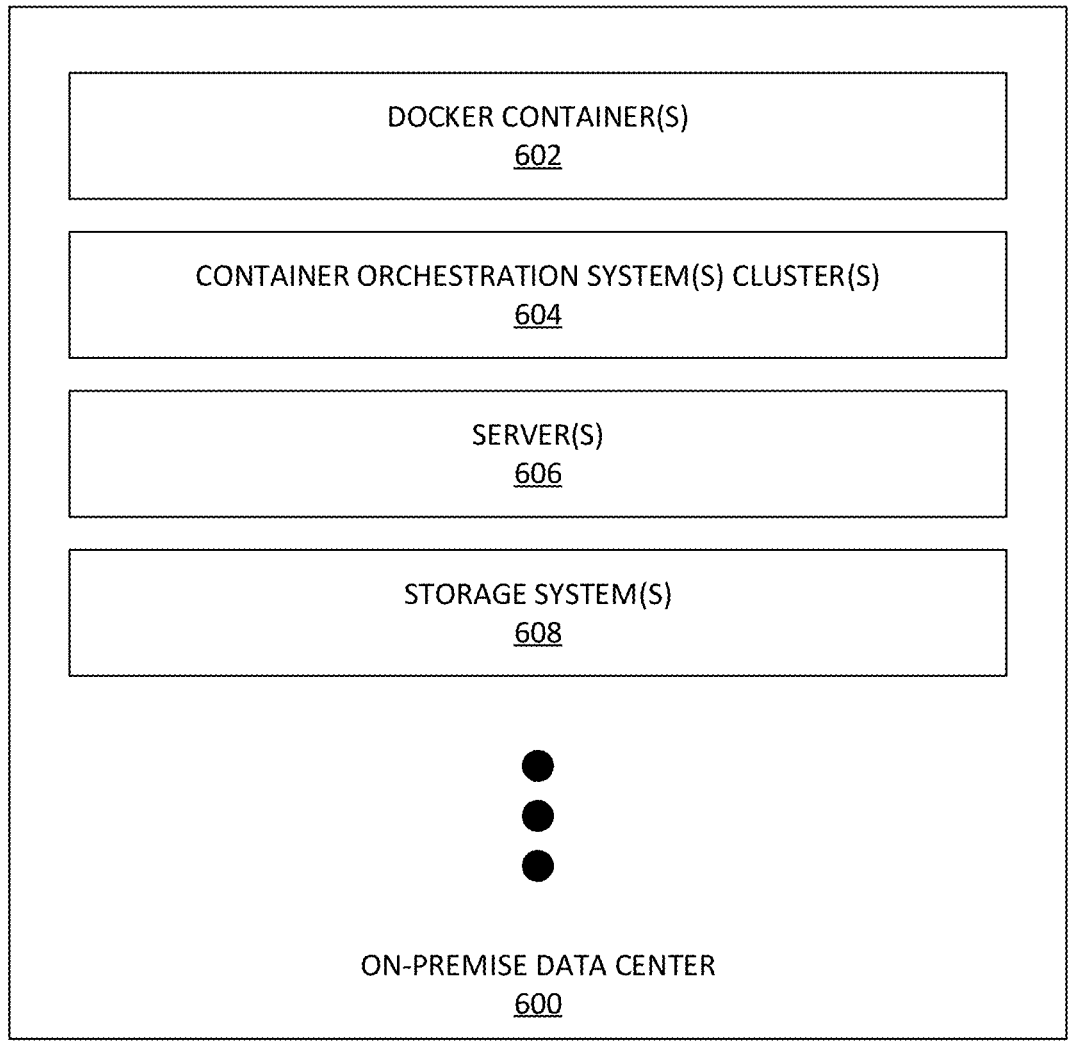
FIG. 6 illustrates an example on-premise data center, according to some embodiments.

FIG. 6 illustrates an example on-premise data center 600, according to some embodiments. On-premise data center 600 can include Docker container(s) 602 (and/or other container standards). On-premise data center 600 can include container orchestration system(s) cluster(s) 604 (e.g. Kubernetes clusters, etc.). On-premise data center 600 can include severs 606 and storage systems 608.

Figure 7:
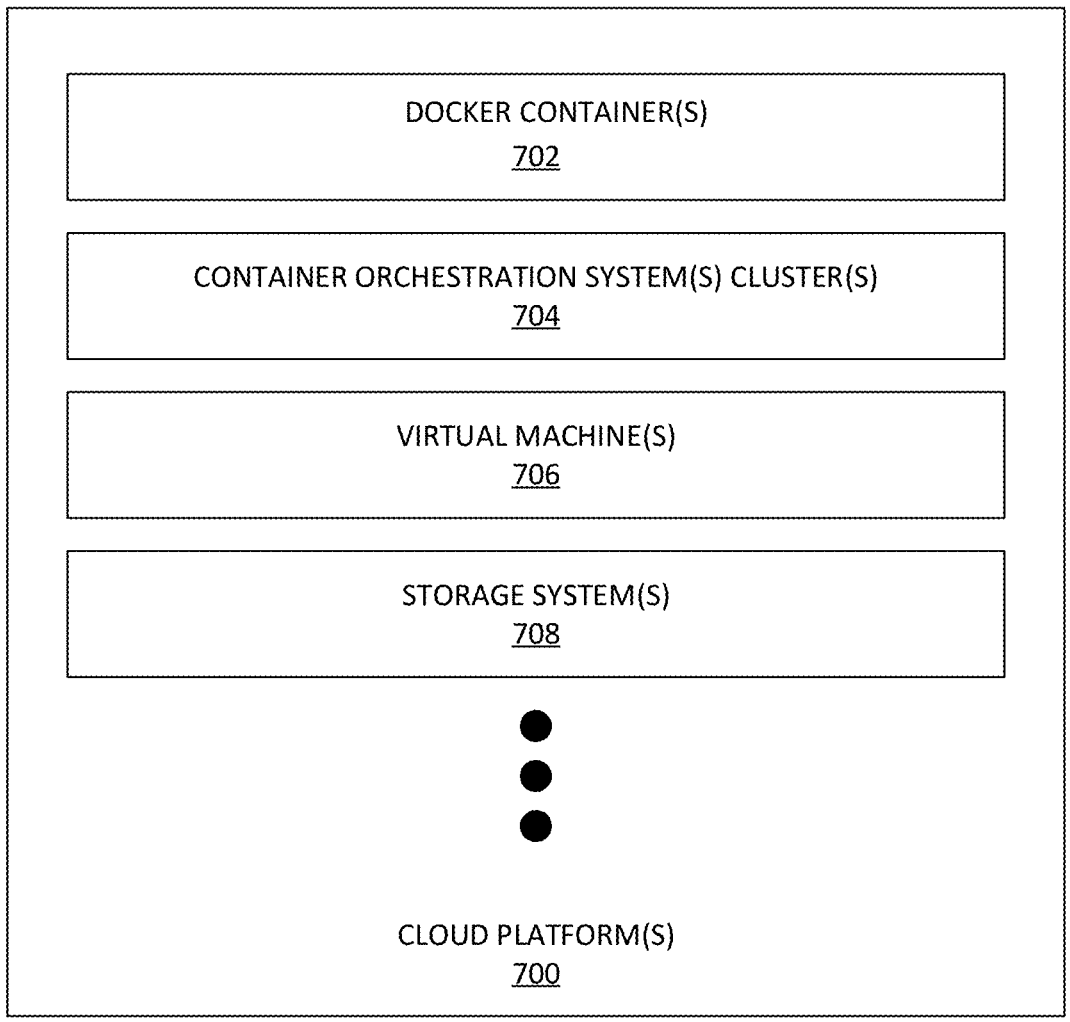
FIG. 7 illustrates an example cloud platform, according to some embodiments.

FIG. 7 illustrates an example cloud platform 700, according to some embodiments. Cloud platform 700 can include Docker container(s) 702, where Docker container standard is used as an example but other CNCF (Cloud Native Computing Foundation) standards can be applied as well. Cloud platform 700 can include container orchestration system(s) cluster(s) 704 (e.g. Kubernetes clusters, etc.). On-premise data center 700 can include virtual machines 706 and storage systems 708.

Example Optimization of Cloud Application Performance

Figure 8:
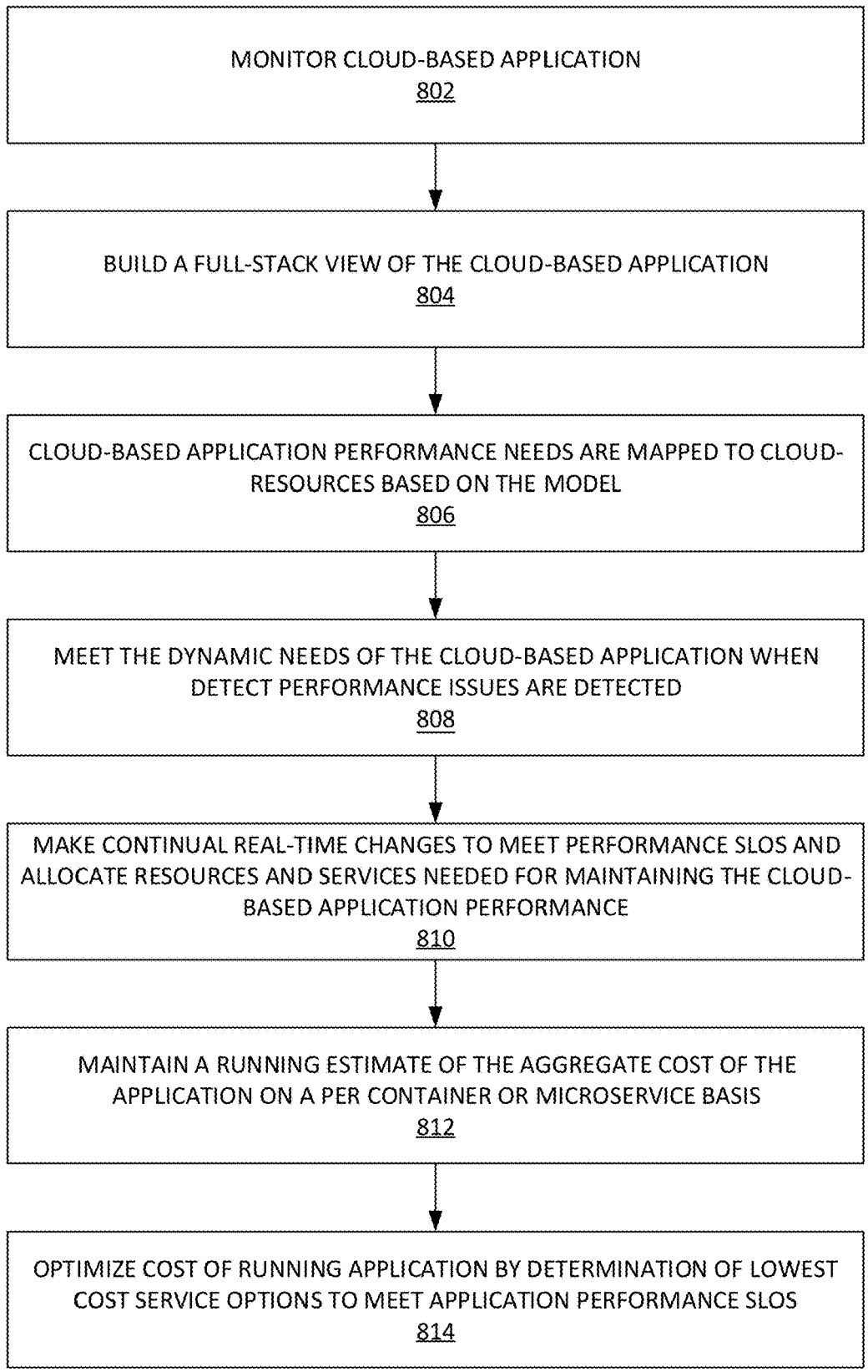
FIG. 8 illustrates an example process for optimizing cloud application performance, according to some embodiments.

FIG. 8 illustrates an example process 800 for optimizing cloud application performance, according to some embodiments. A cloud application can be a cloud-based application. Process 800 can provide an approach to optimize the management of cloud applications to meet operational objectives such as maximizing performance, availability and data governance, subject to cost constraints.

In some embodiments, optimization is related to cloud application performance. It is noted that optimization can be extended to other dimensions including, inter alia: application availability, application security, etc.

It is noted that optimization of a cloud application can be based on two factors, inter alia. The first can be the desired performance objective, (e.g. SLO). The second can be the associated cost of the cloud resources. The cost and performance also relates to the level of utilization that is acceptable. For example, the higher the utilization, the more cost-effective the use of resources can be.

In step 802, monitoring of the cloud application can be implemented. Process 800 can monitor the cloud application at a very granular level across the layers, including, inter alia: the container layer, microservice components, orchestration (e.g. Kubernetes) layer, the cloud-infrastructure layer, etc. It is noted that in some cases, there may not be an intermediate orchestration layer and microservices may be mapped directly to the underlying cloud services. It is noted that different mechanisms can be used to monitor the different layers of the cloud application. For example, cloud-infrastructure layer monitoring can be monitored using a specified cloud vendors' tools (e.g., Cloud Watch® from AWS). Kubernetes gateways can receive configurations and events from the Kubernetes layer. Container metrics from the containers via metrics from Prometheus. By ingesting data related to the cloud application configuration, events, and metrics from these layers, process 800 can build a full-stack view of the cloud application in step 804.

An application model can be provided. Accordingly, in step 806, the cloud application performance needs are mapped to cloud-resources based on the application model.

In step 808, if performance problems and issues are detected by the monitoring, then cloud resources are dynamically adjusted as needed in the orchestration layer, (e.g. Kubernetes, and/or in the cloud infrastructure layer).

On a continuous basis, real-time changes as made in closed loop fashion to allocate or reallocate resources to meet application performance SLOs in step 810.

In step 812, on an ongoing basis as cloud resources are consumed, a real-time aggregate cost for the application operation is computed.

To optimize the cost of application operations while meeting performance SLOs, in step 814 determination is made of the best choice of cloud service types and number of instances so as to minimize total cost.

An example full-stack view 900 of the cloud application as shown in FIG. 9, according to some embodiments. As shown, the example full-stack view 900 illustrates the various application monitored layer from the container layer (shown on top) to the cloud-infrastructure layer (e.g. cloud resource layer). As shown, example full-stack view 900 provides the full structure of the discovered cloud application. This can include both the dependency of the cloud application on the underlying cloud resources and services, mapped from application containers at the first layer to the orchestration (e.g., Kubernetes) or second layer down to the cloud infrastructure or the third layer. Example full-stack view 900 provides both the impact of the cloud resources on the performance and cost of the application in real-time. More specifically, application Layer 902 shows example components and interconnections. Orchestration Layer 904 shows an example orchestration cluster (e.g., Kubernetes cluster, etc.) with nodes that contain which relevant application components. Infrastructure layer 908 shows the orchestration nodes and application services and the relevant utilized cloud services.

FIG. 10 illustrates an example container level view 1000 of a cloud application, according to some embodiments. The example container level view 1000 discovered and created by a monitoring software implementation is provided in step 806 infra. As shown the application layer map comprises all microservices and their interconnection, including directional data flow, as well as groupings such as functional groupings where a group of cooperating microservices implement a specific function. More specifically, FIG. 10 illustrates example functional group of microservices 1002, example data flow 1004, and example microservices and/or containers 1006.

Returning to process 800, in step 806 the cloud application performance needs can be mapped to cloud-resource(s) needs. In one example, by relating KPIs to resources (e.g. including accounting for application resource auto-scaling, etc.), process 800 can determine an accounting of the needed resources for meeting the application performance SLO. This can be for specified times and across aggregated measured intervals. The total resources used can be based on cloud resources consumed (e.g. CPU by time as shown in FIG. 11).

FIG. 11 illustrates an example view 1100 of CPU usage by time for a container, according some embodiments. Additionally, FIG. 12 illustrates an example view 1200 of disk usage (e.g. writes) by time for a container, according to some embodiments.

It is noted that, at the same time, SLOs are monitored against SLIs as shown in FIG. 13, according to some embodiments. In order to meet the dynamic needs of the cloud application, process 800 also detect performance issues such as where resource needs are exceeded in step 808.

It is noted that the detection of performance issues is not limited directly to the cloud resource. For example, FIG. 14 illustrates an example with the performance SLO of Kafka, according to some embodiments. As shown, the performance SLO of Kafka is indicated by a Kafka-specific metric such as consumer group lag, and not by a specific resource limitation. For example, the details of an example microservice 1402 implemented as a container including relevant resource metrics and indication of SLO breach.

To remedy the SLO breach, the system has to continuously monitor the cloud application performance, proactively detect the performance issues, identify the cause based on the structure of the application that has been determined, and then take corrective action based on approaches as outlined in U.S. patent application Ser. No. 15/479,042 titled: 'SYSTEMS AND METHODS FOR PROVISIONING OF STORAGE FOR VIRTUALIZED APPLICATIONS,' filed on 2017 Apr. 4 and published as US 2017/0206107 which is hereby incorporated by reference.

By making continual real-time changes to meet performance SLOs, process 800 can allocate resources and services needed for maintaining the cloud application performance in step 810. This can be done without overprovisioning resources. In an example overprovisioned case, there can be a delayed process where periodic checks are made after days and weeks to determine what actual resources usage was needed and then turn off excess resources such as cloud VMs that were never needed.

Process 800 can implement cost optimizations. Because process 800 maps the complete application down to the services it comprises, in step 812, can maintain a running estimate of the aggregate cost of the application on a per container or microservice basis. In step 814, because cloud cost metrics are available from cloud vendors, process 800 can optimize the cost based on pricing of services.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for optimizing cloud application performance, comprising: monitoring of a cloud application, wherein the cloud application is a microservice application comprising a set of containerized microservices that are managed by a container orchestration system by: obtaining a cloud-resource consumption of a per container level metric for each component of a cloud application, displaying the cloud-resource consumption for each component of the cloud application; building a full-stack view of the cloud application; providing an application mode; mapping one or more cloud application performance needs to a set of cloud-resources based on the application model; detecting a performance problem with the cloud application; dynamically adjusting a specified layer of the cloud application related to the per container level metric to meet an application performance SLO, wherein the application performance SLO includes a performance SLO of an ingress controller including NGINX and HAProxy that is indicated by a ingress controller-specific performance metric such as request rates per second which when lower than a target objective indicates an SLO breach of throughput; and as cloud resources are consumed, determine a real-time aggregate cost for a specified application operation.

2. The computerized method of claim 1 wherein the step of monitoring the cloud application further comprises:
   monitoring a container layer of the cloud application.

3. The computerized method of claim 1, wherein the container orchestration system comprises a Kubernetes container orchestration system.

4. The computerized method of claim 2 wherein the step of monitoring the cloud application further comprises:
   monitoring the microservice components of the cloud application.

5. The computerized method of claim 4 wherein the step of monitoring the cloud application further comprises:
   monitoring the orchestration layer of the cloud application.

6. The computerized method of claim 5, wherein the orchestration layer comprises a Kubernetes layer.

7. The computerized method of claim 6, wherein the step of monitoring the cloud application further comprises:
   monitoring the cloud-infrastructure layer of the cloud application.

8. The computerized method of claim 7, wherein a set of real-time changes as implemented in a closed loop fashion to allocate or reallocate resources to meet the application performance SLO on a continuous basis.

9. The computerized method of claim 8 further comprising:
   optimizing a cost of application operations of the cloud application while meeting performance SLOs, by determining a specified choice of a cloud service types and a number of instances so as to a minimize the cost of the application operations.

10. The computerized method of claim 9 further comprising:
    determining an accounting of a set of needed resources for meeting the application performance SLO.

11. The computerized method of claim 10, wherein the step of determining an accounting of a set of needed resources for meeting the application performance SLO is implemented for a set of specified times and across a set of aggregated measured intervals.

12. The computerized method of claim 11, wherein the step of determining an accounting of a set of needed resources for meeting the application performance SLO includes determining the total resources used based on the cloud resources consumed.

13. The computerized method of claim 12, wherein the cloud application is implemented on a private cloud-computing platform.

14. The computerized method of claim 12, wherein the cloud application is implemented on a public cloud-computing platform.

15. The computerized method of claim 3, wherein the set of containerized microservices that are managed by the Kubernetes container orchestration system comprises a CPU usage and a memory from a cloud virtual machine (VM) microservice.

16. The computerized method of claim 3, wherein the set of containerized microservices that are managed by the Kubernetes container orchestration system comprises a Disk IO microservice.

* * * * *